United States Patent [19]

Greenhalgh et al.

[11] Patent Number: 4,993,774
[45] Date of Patent: * Feb. 19, 1991

[54] EDGE-ENCAPSULATED GLAZING MODULE

[75] Inventors: Geoffrey Greenhalgh; Peter Morris; John N. Bearon, all of Lancashire, England; Guenter Armbruster, Krefeld, Fed. Rep. of Germany

[73] Assignees: Pilkington plc, St. Helens, England; Flachglas Aktiengesellschaft, Fuerth/Bay, Fed. Rep. of Germany

[ * ] Notice: The portion of the term of this patent subsequent to Aug. 8, 2006 has been disclaimed.

[21] Appl. No.: 389,917

[22] Filed: Aug. 7, 1989

Related U.S. Application Data

[62] Division of Ser. No. 64,056, Jun. 19, 1987, Pat. No. 4,854,636.

[30] Foreign Application Priority Data

Jun. 26, 1986 [GB] United Kingdom ................ 8615677

[51] Int. Cl.⁵ .............................................. B60J 1/00
[52] U.S. Cl. .................................... 296/201; 296/208; 296/84.1; 362/61; 340/461
[58] Field of Search ...................... 296/208, 201, 84.1, 296/1 R, 180.1; 52/208; 362/61; 340/467

[56] References Cited

U.S. PATENT DOCUMENTS

| 3,995,142 | 11/1976 | Ciardelli et al. | 219/522 |
| 4,072,340 | 2/1978 | Morgan | 296/201 |
| 4,387,853 | 6/1983 | Sarai et al. | 296/84.1 |
| 4,477,115 | 10/1984 | Asakura et al. | 296/180.1 |
| 4,707,014 | 11/1987 | Rich | 296/180.1 |

FOREIGN PATENT DOCUMENTS

| 0122545 | 10/1984 | European Pat. Off. | 296/201 |
| 0145354 | 6/1985 | European Pat. Off. | 296/201 |
| 1160320 | 12/1963 | Fed. Rep. of Germany | 296/201 |
| 2210178 | 9/1973 | Fed. Rep. of Germany | 296/201 |
| 7515823 | 7/1977 | Fed. Rep. of Germany | 296/201 |
| 2913114 | 10/1980 | Fed. Rep. of Germany | 296/180.1 |
| 8517313 | 10/1985 | Fed. Rep. of Germany | 296/201 |
| 1197127 | 6/1959 | France | 296/201 |
| 1237187 | 6/1960 | France | 296/201 |
| 2454948 | 11/1980 | France | 296/201 |
| 61-50824 | 3/1986 | Japan | 296/201 |
| 986542 | 3/1965 | United Kingdom | 296/201 |
| 1001853 | 8/1965 | United Kingdom | 296/201 |
| 1263315 | 2/1972 | United Kingdom | 296/201 |
| 2091327 | 7/1982 | United Kingdom | 296/201 |
| 2092655 | 8/1982 | United Kingdom | 296/201 |
| 2115049 | 9/1983 | United Kingdom | 296/201 |
| 2119000 | 11/1983 | United Kingdom | 296/201 |
| 2152124 | 7/1985 | United Kingdom | 296/201 |
| 2153292 | 8/1985 | United Kingdom | 296/201 |

Primary Examiner—Robert R. Song
Attorney, Agent, or Firm—Burns, Doane, Swecker & Mathis

[57] ABSTRACT

An edge-encapsulated glazing module for a vehicle has a moulded encapsulation which embodies means to provide a function other than the fitting of the module to a vehicle body. The said means may be means for mounting a lighting unit; conduit means; or a mounting for a vehicle accessory. The lighting unit may be a rear light for the vehicle. The conduit means may comprise electrical leads on an RF lead. Alternatively, the conduit means may comprise a hollow tube for water or air. The vehicle accessory may be a rear view mirror; a license disc, windscreen wiper or a spoiler.

13 Claims, 5 Drawing Sheets

EDGE-ENCAPSULATED GLAZING MODULE

This application is a divisional, of application Ser. No. 07/064,056, filed June 19, 1987, U.S. Pat. No. 4,854,636

This invention relates to edge-encapsulated glazing modules, in particular to modular windows for motor vehicles.

BACKGROUND OF THE INVENTION

In the past most fixed motor vehicle windows were held in place by a weatherstrip of rubber or similar material which also held in position a decorative moulding, sometimes known as a trim strip, to obscure from the exterior the joint between the glazing material and the vehicle body frame. The trim strip has been of plastics material and/or metal. The weatherstrip was designed for example to fit around the edge of the glazing material and at the same time to fit to the body frame within the aperture provided for the glazing. The weatherstrip therefore had to be individually made and fitted for each differently shaped vehicle window, for example, the windscreen, rear window and fixed side windows of an automobile. It is known from GB-2 092 655 to provide a weatherstrip, for a rear window of a vehicle, which has an integral rear spoiler fin.

Subsequently the glazing material has been secured directly by adhesive to a suitable flange provided on the vehicle body frame. Trim strips are usually still used and have to be secured in position.

More recently, commercial use began of edge-encapsulated glazing modules as modular windows for vehicles, in which a gasket of rubber or plastic material is moulded around the edge of the glazing material and is utilised in securing the glazing material in position on the vehicle body frame.

In some of the earliest edge-encapsulation proposals encapsulation was moulded around the edges of the glazing material whilst it was held in position in the motor vehicle, as described in GB-1 001 853 and FR-2 157 189. Another proposal in GB-675 147 involved moulding a rubber gasket around the edge of a glass sheet, after metallising the surfaces of the edge of the glass sheet, to improve adhesion of the rubber to the glass sheet.

U.S. Pat. No. -4,072,340 and U.S. Pat. No. -139,234 describe edge-encapsulated glass windows for vehicles, mainly small windows such as quarter lights for automobiles, in which fixing members are incorporated in the moulded edge-encapsulation.

The fixing members are positioned around the edge of the window and designed to co-operate with other members or holes in the vehicle body frame, so as to assist in securing the window in position. A trim strip is also incorporated in the moulded encapsulation and adhesive is used, in addition to the fixing members, to secure the window to the vehicle body frame. The preferred moulding material is polyvinyl chloride.

Reaction injection moulding techniques for moulding with material such as polyurethane have been used for some years and are now in widespread use. The application of that technique to the moulding of edge-encapsulation around a vehicle window is described for example in JP-57-158481 (laid open publication), which describes the injection of two or more components of a reaction mixture into a mould defining a suitable cavity around the edge of a sheet of glazing material, under suitable conditions of pressure and temperature to obtain a moulded edge-encapsulation of, for example, polyurethane resins. Other resins and moulding methods are also disclosed.

Other proposals for moulded edge-encapsulation of vehicle windows are described in EP-76924, EP-122 545, EP-122 636, EP-127 546, EP-145 354, GB-2 115 049, GB-2 141 375, GB-2 147 244, GB-2 153 292 and WO 85/01468. Several of these publications relate to the reaction injection moulding of polyurethane materials, the provision of moulds for reaction injection moulding of edge-encapsulation on sheets of glazing material, and the modular windows produced.

GB-2 115 049 describes the inclusion of metal frame parts, which are utilised in securing a window in position, within the moulded encapsulation.

In all these publications, the mouldings are shaped to encapsulate the edge of the glazing material, to hold or form whatever trim strip is required, and may also incorporate fasteners or parts of fasteners or frame parts.

It is a main object of the present invention to adapt edge-encapsulation moulding techniques in order to incorporate services which would be associated with vehicle glazing or to facilitate the mounting of accessories which are usually provided in close proximity to a vehicle window.

SUMMARY OF THE INVENTION

From its broadest aspect, the invention provides an edge-encapsulated glazing module for a vehicle in which the moulded encapsulation embodies means to provide a function other than the fitting of the module to a vehicle body.

In one embodiment of the invention the moulded encapsulation embodies means for mounting a lighting unit. When the glazing module is for use as the rear window of a vehicle an edge of the encapsulation of the module may be moulded with an aperture for receiving a lighting unit. That lighting unit mounted in the aperture in the lower edge may include at least one rear light for the vehicle. The lighting unit may include brake lights, reversing lights, rear warning lights, and fog lamps. The aperture may be moulded into the lower edge of the encapsulation.

The encapsulation may incorporate electrical leads for connection to the lighting unit.

Other lighting units may be mounted in an aperture moulded in the upper edge of the encapsulation of the rear window module, or may be the interior lights fitted into apertures in the interior surface of the edge-encapsulation moulding around a windscreen.

In another embodiment of the invention, the moulded encapsulation embodies conduit means. The conduit means may comprise electrical leads.

Glazing modules for motor vehicles, for example both for windscreens and rear windows of automobiles may include a heater and in another embodiment of the invention the conduit means comprises electrical leads which are embedded in the encapsulation and which are connected to the heater.

A radio aerial may be provided on a glazing module for a vehicle and in some cases the heater array on the rear window also acts as a radio aerial. From this aspect of the invention, for a glazing module which carries a radio aerial, the conduit means is an RF lead which is embedded in the encapsulation and which is connected to the aerial.

It is normal to provide air and water services in association with a glazing module for washing the outer surface and for de-misting the inner surface and further according to the invention the conduit means comprises a hollow tube embedded in the encapsulation and having at least one outlet adjacent a surface of the glazing.

When the hollow tube is for water it may be connected to at least one outlet nozzle which is embodied in the encapsulation during moulding. It would be usual to provide two such outlet nozzles moulded into either the upper or the lower edge of the outer surface of the encapsulation of a windscreen and to provide one outlet nozzle moulded in the upper edge of the encapsulation of a rear window which is cleaned by a wiper.

Further according to the invention the hollow tube may be for air and leads to at least one air outlet slot which is moulded in the encapsulation. Such air outlet slots would be moulded in the inner surface of the encapsulation of a windscreen so as to direct de-misting air flows upwardly over that inner surface.

According to a further embodiment of the invention the moulded encapsulation may embody a mounting for a vehicle accessory.

When the glazing module is a windscreen module, the mounting may comprise attachment means for a rear-view mirror which is moulded into the upper edge of the encapsulation.

Attachment means for a licence disc may be moulded at one lower corner of the encapsulation. Either or both of these would be moulded in the inner surface of the encapsulation.

Also when the glazing module is a windscreen module or a rear window module a sleeve for a windscreen wiper drive shaft may be moulded in to the lower edge of the encapsulation. Such a sleeve could be aligned with a hole provided in the glazing material near to its lower edge.

The encapsulation may be moulded with an external shape which performs an auxiliary function. For example the encapsulation may be moulded with an aerodynamic shape. The encapsulation moulded along the upper edge of a glazing module for use as the rear window of a vehicle may embody a moulded spoiler, or a mounting for a spoiler.

BRIEF DESCRIPTION OF THE DRAWINGS

Some embodiments of the invention will now be described, by way of example, with reference to the accompanying drawings in which.

DETAILED DESCRIPTION OF THE PREFERRED EMBODIMENTS

A glazing module for a vehicle may be a windscreen, a rear window, a roof light or any of the side windows of the vehicle and there have been proposals as referred to above for edge-encapsulation of such glazing modules by moulding a synthetic rubber-like plastics material directly around the edge of the glazing material.

The glazing material may be any appropriate transparent material, in dependence on the nature of the vehicle. For example the glazing material may be a single sheet of toughened glass, a single sheet of annealed glass, a laminate including one or more sheets of glass, toughened or annealed, with one or more sheets of transparent plastics material. Further the glazing material may be a single sheet of transparent plastics material such as an acrylic material or polycarbonate material, or a laminate of one or more sheets of transparent plastics material.

Figure 1:
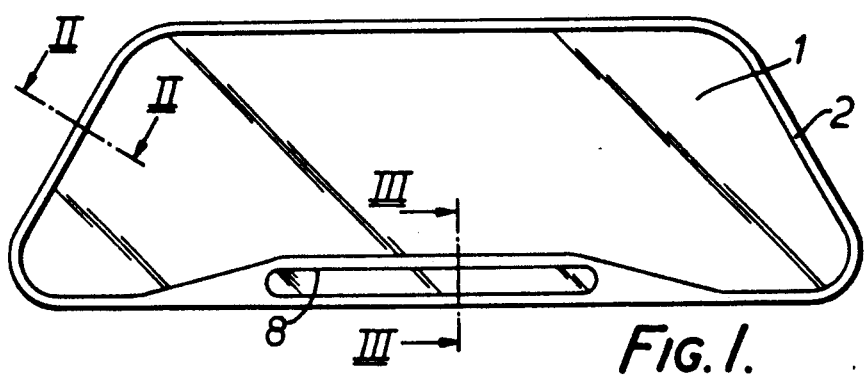
FIG. 1 is an elevation of an edge-encapsulated automobile rear window with provision for mounting a brake light.

FIG. 1 illustrates a typical automobile rear window shape and in this embodiment of the invention a single sheet 1 of glass, for example 3.5 mm thick, which has been bent and toughened in conventional manner has moulded directly around its edge an edge-encapsulation 2 of a polyurethane resin. The edge-encapsulation 2 is moulded in conventional manner by a reaction injection moulding technique.

Figure 2:
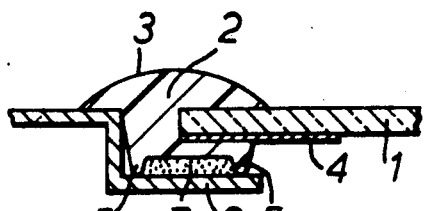
FIG. 2 is a section on line II—II of FIG. 1.

The encapsulation is moulded so that it has a decorative appearance from the outside. As shown in FIG. 2 the outer part 3 of the moulded encapsulation 2 serves as a trim strip which, together with an obscuration band 4 which is fired around the peripheral edge of the inner surface of the glass sheet, provides a neat appearance when the module is in position in the vehicle body.

Figure 3:
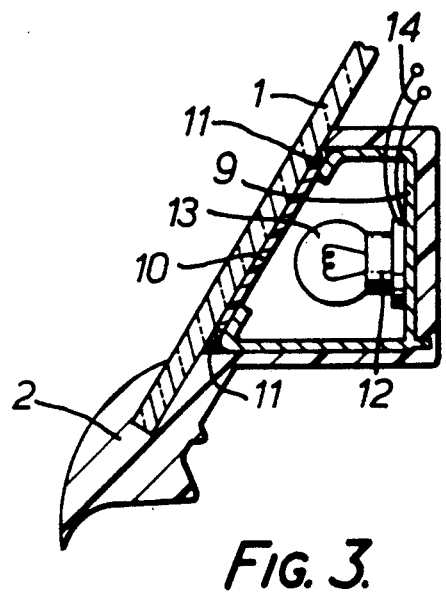
FIG. 3 is a section on line III—III of FIG. 1.

The inner surface of the moulded encapsulation is moulded with ridges 5 which assist the adhesion of the moulded encapsulation 2 to a flange 6 of the vehicle body frame by means of a conventional adhesive 7 which is contained between the ridges 5. These ridges are however optional and are not present in some of the embodiments described. The lower edge of the moulded encapsulation 2 embodies means for mounting a lighting unit in the form of an aperture 8 in which a lighting unit for the vehicle is mounted. The lighting unit may include brake lights, reversing light, rear warning lights and fog lamps. In the embodiment of FIGS. 1 to 3 the lighting unit acts as a brake light and comprises a lamp housing 9 with a front window closed by a red transparent moulded plastics screen 10 which is sealed to an open window in the lamp housing 9 by sealing material 11. Mounted on the back wall of the housing 9 opposite the open window there are one or more sockets for brake lights 13 and electrical leads from the socket or sockets 12 are indicated at 14. When manufacturing the glazing module the brake light housing is placed in the appropriate position on the surface of the glass sheet 1 when it is laid in the mould and the plastics material of the encapsulation is moulded right around the lamp housing which is thereby secured to the rear window by being embodied completely within the moulded encapsulation. The encapsulation may incorporate the electrical leads 14 which run in the encapsulation to one side of the rear window for connection to the brake light circuit of the vehicle.

The lamp housing 9 and its transparent screen 10 may be divided so as to include red brake lights, white reversing lights, rear warning lights, indicator lights and rear fog lamps.

Figure 4:
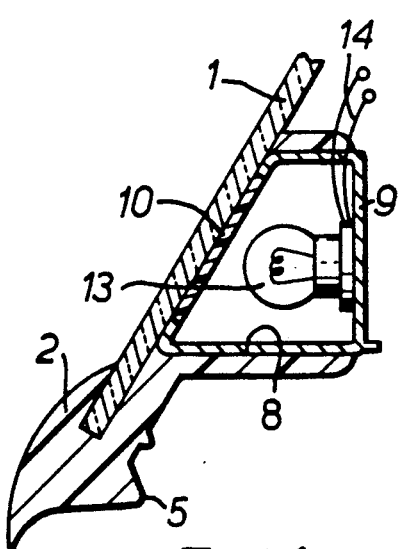
FIG. 4 is a view similar to FIG. 3 showing a modification of the moulded encapsulation so that the brake light can be a push-fit into the encapsulation.

A simpler form of mounting for a brake light unit is illustrated in FIG. 4 which is a modification of the rear window module of FIGS. 1 to 3. The lower edge of the encapsulation is moulded with an open aperture 8 and the lamp housing 9 is a push-fit into that aperture and is not enclosed by the encapsulation. The lens screen 10 may be carried by the lamp housing or may be moulded in situ into the encapsulation with the open faced lamp housing pushed into position against the lens screen 10. This simplified form provides easier replacement of bulbs 13 by simply withdrawing the housing 9 from the aperture 8.

Figure 5:
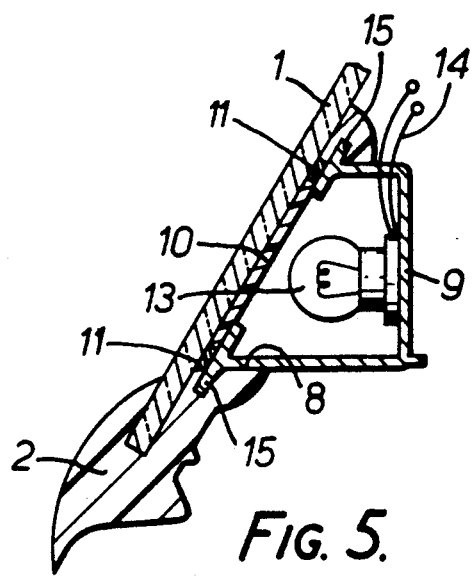
FIG. 5 is a section similar to FIG. 3 showing another embodiment of an edge-encapsulated rear window which embodies a brake light.

Yet another form of encapsulated lighting unit is shown in FIG. 5 in which the housing 9 has a peripheral flange 15 which is embodied in the moulded encapsulation so that the lighting unit is thereby secured in position with its lens screen 10 abutting the glass sheet 1. The lens screen 10 is sealed to the flange 15 by sealing material 11 before encapsulation. The rear of the lighting unit is accessible for the replacement of bulbs.

Figure 6:
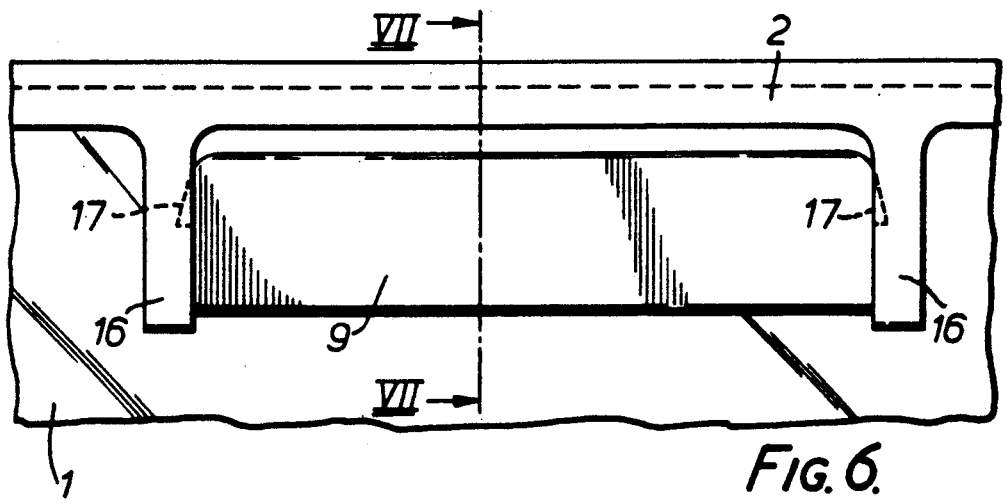
FIG. 6 is a fragmentary view of part of the upper edge of an edge-encapsulated vehicle rear window which embodies means for mounting a brake light adjacent to the upper edge.
Figure 7:
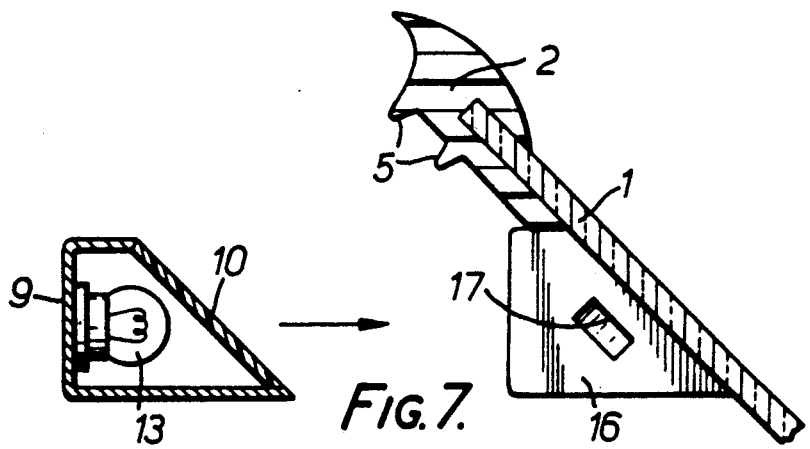
FIG. 7 is a section on line VII—VII of FIG. 6 and indicating how a brake light would be a push-fit in to the moulded encapsulation of FIG. 6.

A lighting unit similar to that of FIGS. 3 to 5 may be mounted adjacent the upper edge of the rear window as illustrated in FIGS. 6 and 7. The moulded edge-encapsulation 2 includes, extending downwardly from the central part of the upper edge of the encapsulation two brackets 16 which extend downwardly over the inner surface of the rear window and define between them a space for receiving a lighting unit 9. In each of the brackets 16 there is a wedge-shaped recess 17 and noses, not shown, on the side walls of the lamp housing 9 snap into these recesses 17 to locate the housing 9 in position between the brackets 16. The dimensions are such that the fitting of the lamp housing 9 between the brackets 16 relies on the resilience of the brackets 16 so that the housing 9 is securely held in position adjacent the upper edge-encapsulation.

Figure 8:
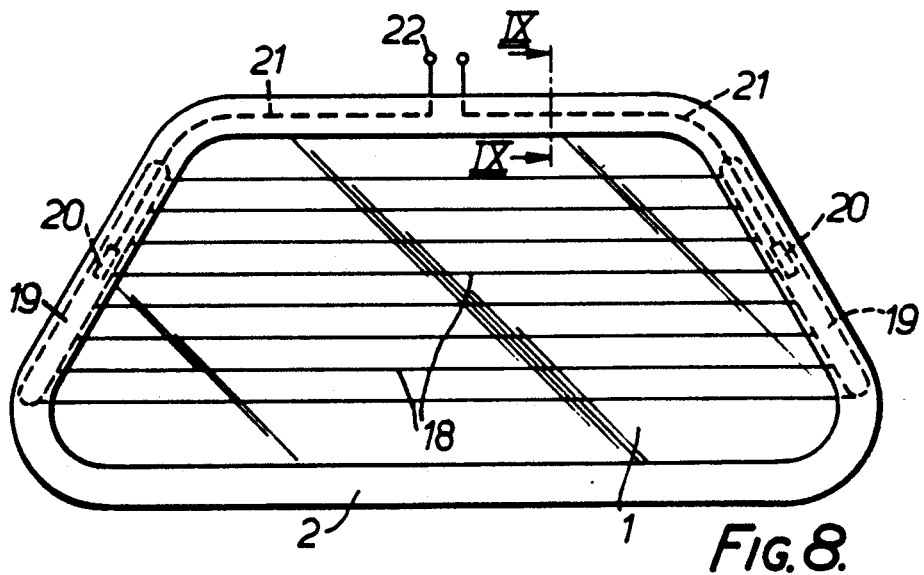
FIG. 8 is an elevation of an automobile rear window which includes a heater and in which the moulded encapsulation incorporates electrical leads to the heater.
Figure 9:
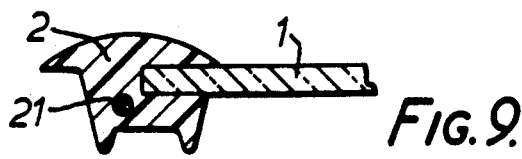
FIG. 9 is a section on line IX—IX of FIG. 8.

FIGS. 8 and 9 illustrate an automobile rear window having a conventional heater 18 for clearing mist and ice from the rear window. The heater 18 has the form of fired-on electrical conductors which run horizontally across the inner surface of the glass sheet 1 to form a parallel network interconnecting a pair of electrically conductive busbars 19 which are fired onto the inner surface of the sheet 1 in conventional manner. Customary T-piece electrical connectors 20 are soldered to the busbars 19. Electrical leads 21 are connected to the T-pieces 20. Alternatively the leads 21 may be soldered to the busbars 19. The heating conductors 18, busbars 19, connectors 20 and leads 21 are assembled in known manner during and following the bending and toughening of the glass sheet 1. The leads 21 may be held by spring clips, for example, attached to the edge of the glass sheet where they run around the upper edge of the sheet to terminals 22 which are for eventual connection to the heating circuit. The shape of the mould cavity encompasses the connectors 20, the leads 21 and the terminals 22 so that the moulded encapsulation incorporates those members including the electrical leads 21 in the manner illustrated in FIG. 9. When the rear window module has been adhered in position in the vehicle body frame all that is then necessary is to connect the heater circuit to the terminals 22.

Figure 10:
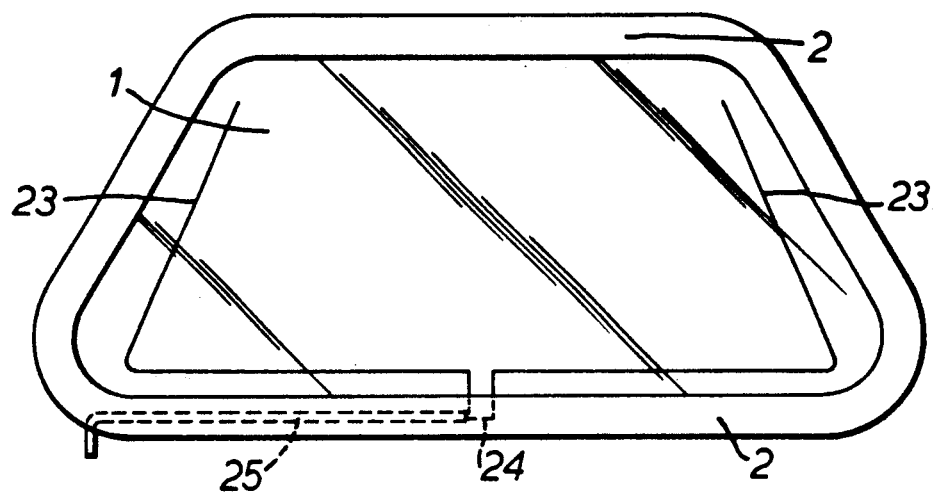
FIG. 10 is a view similar to FIG. 8 illustrating an automobile rear window which carries a radio aerial with an RF lead moulded in to the edge-encapsulation.

The glazing module may carry a radio aerial and FIG. 10 illustrates a form of radio aerial fired on to the glass sheet 1 during the bending and toughening operation. The radio aerial array 23 leads to a connection point 24 and, before moulding the encapsulation, an RF lead would be connected to the connection point 24. The RF lead is indicated at 25 and is moulded into the encapsulation of the lower edge in the same way as illustrated in FIG. 9, and leads to one side of the window for connection to a radio receiver located inside the vehicle.

Figure 11:
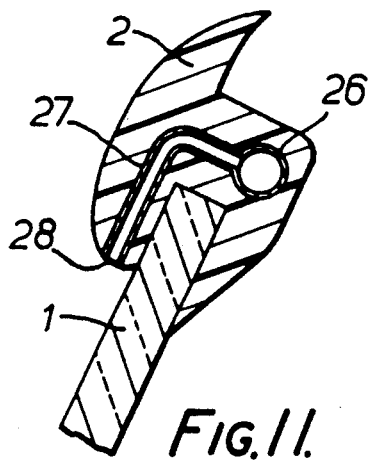
FIG. 11 is a sectional view through the upper edge of an edge-encapsulated windscreen with a water conduit in the encapsulation leading to an outlet nozzle.

The moulded encapsulation can also be used to provide supplies of washing water or de-misting air to the surfaces of the glazing module. FIG. 11 illustrates how the encapsulation of the upper edge of a windscreen 1 may embody thin-walled plastics tubing which forms an internal conduit 26 which is connected by a branch 27 to an outlet nozzle 28 which is positioned adjacent the outer surface of the windscreen and points downwardly. The thin-walled plastics tubing employed for the conduit 26 and its branches 27 may be for example polyvinyl chloride tubing which is located in position relative to the edge of the sheet 1, by suitable clips, not shown, before the assembly is placed in the mould. The encapsulation then embodies the conduit 26 the branches 27 and the outlet nozzle or nozzles 28. Normally for a windscreen there would be two such outlet nozzles 28 positioned above the vision zones which are cleaned by the windscreen wipers. For a rear window there may only be one outlet nozzle which is centrally located at the upper edge of the rear window module above a wiper for the rear window. In either case the conduit 26 is connected to the washing water supply which operates in conventional manner.

Figure 12:
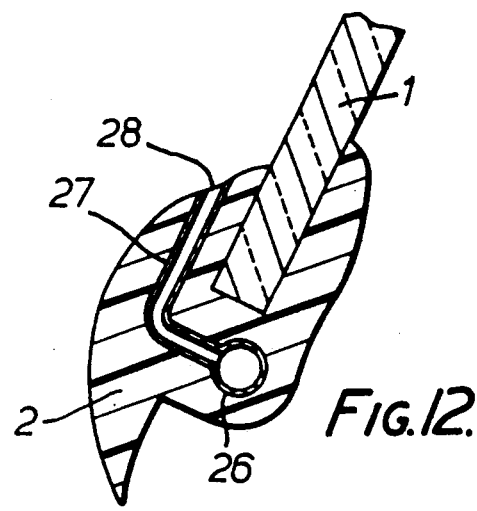
FIG. 12 is a section through the lower edge of an edge-encapsulated windscreen with a conduit for washing water embodied in the encapsulation and leading to an outlet adjacent the lower edge of the outer surface of the windscreen.

FIG. 12 illustrates an alternative in which the conduit 26 and its branch or branches 27 are embodied in the encapsulation 2 of the lower edge of a windscreen 1. The outlet nozzles 28 would provide jets of washing water upwardly in the regions where the windscreen wipers operate.

Figure 13:
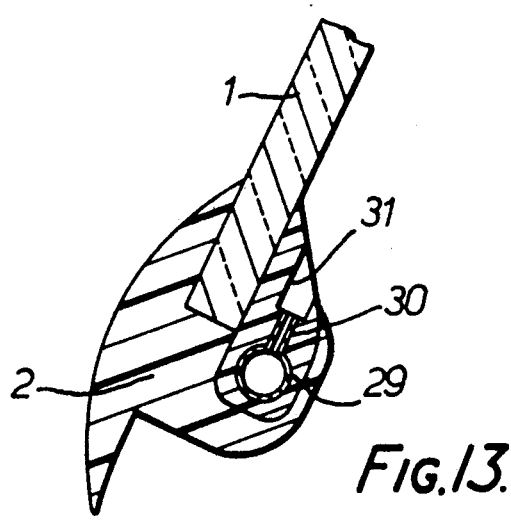
FIG. 13 is a section through the lower edge of a windscreen showing an air duct embodied in the moulded encapsulation leading to an outlet slot which is moulded in the encapsulation and directs air upwardly over the inner surface of the windscreen.

FIG. 13 illustrates a conduit 29 for air which is embodied in the moulded encapsulation 2 of the lower edge of a windscreen 1. The conduit 29 is connected by branches 30 to an air outlet slot 31 which is moulded in the encapsulation and points upwardly adjacent the interior surface of the windscreen. The conduit 29 with its branches 30 and air slot 31 may be preformed in thin plastics material for example polyvinyl chloride and clipped in position relative to the lower edge of the windscreen 1 before the assembly of the windscreen with its auxiliary components is placed in position in the mould.

Figure 14:
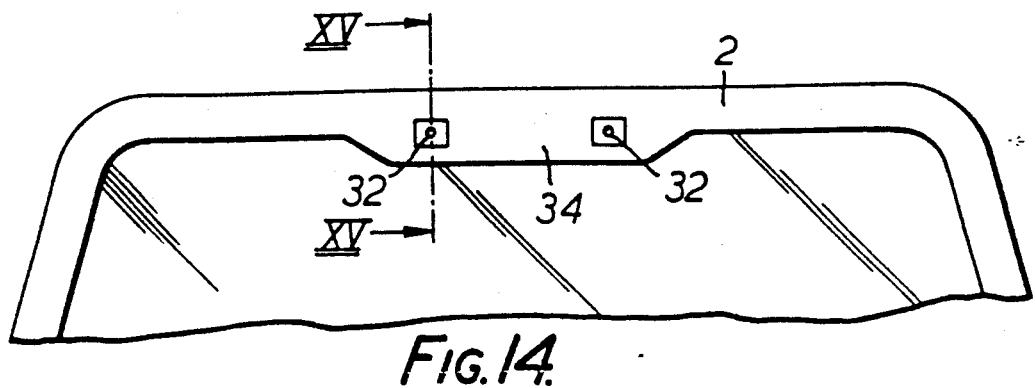
FIG. 14 is an elevation of the upper part of an edge-encapsulated windscreen according to the invention in which the edge-encapsulation embodies a mounting for a rear-view mirror.
Figure 15:
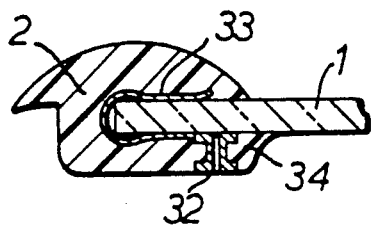
FIG. 15 is a section on line XV—XV of FIG. 14.

The additional function which the moulded encapsulation provides may be for the mounting for a vehicle accessory and FIGS. 14 and 15 illustrate the encapsulation 2 on the upper edge of a windscreen 1 which embodies attachment means for a rear-view mirror. Two nuts 32 of square outer dimensions are held in position on the upper edge of the windscreen 1 by means of spring clips 33 before the windscreen is placed in the mould. The encapsulation is then moulded embodying the nuts 32 in a tongue of the encapsulation 34 to provide sufficient strength for the effective mounting of a rear-view mirror which is fixed in position by means of screws which engage in the nuts 32.

Figure 16:
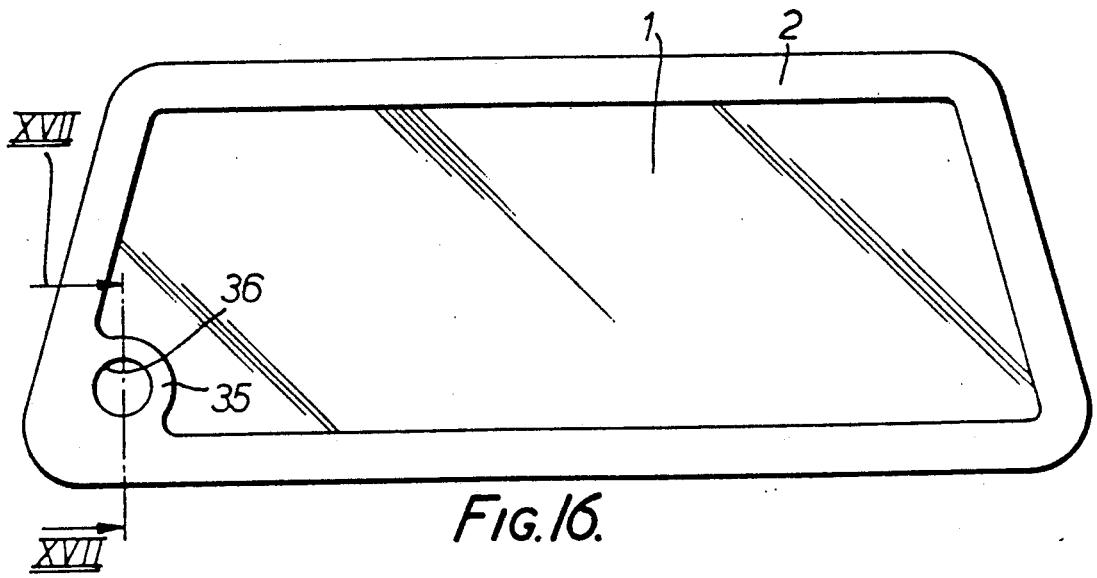
FIG. 16 is an elevation of the inner surface of an edge-encapsulated windscreen according to the invention having attachment means for a licence disc moulded at one lower corner of the encapsulation.
Figure 17:
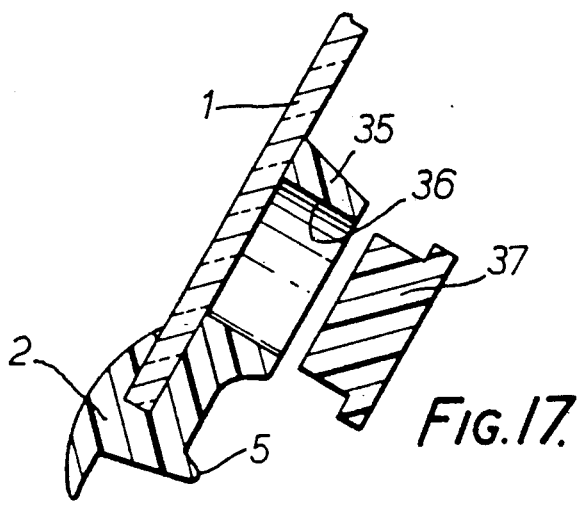
FIG. 17 is a section on line XVII—XVII of FIG. 16 showing a mounting for a licence disc which is a push-fit into the attachment means.

Another way of mounting a vehicle accessory is illustrated in FIGS. 16 and 17 in which a windscreen glazing module has edge-encapsulation 2 which is moulded with an integral attachment ring 35 at one lower corner of the encapsulation which ring 35 is moulded directly on to the inner surface of the windscreen 1 at that corner. The inner diameter 36 of the ring 35 is just slightly larger than the diameter of a licence disc and when the licence disc has been placed in position up against the surface of the windscreen a cylindrical plug 37 of moulded plastics material is pressed into position in the ring 35 to hold the licence disc snugly against the inner surface of the windscreen.

Figure 18:
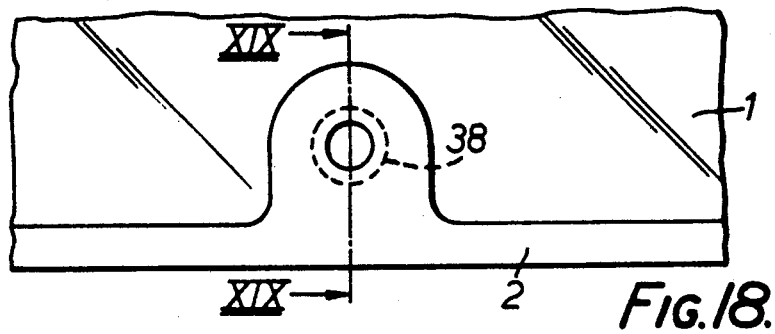
FIG. 18 is a view of part of the lower edge of an edge-encapsulated windscreen module in which the moulded encapsulation embodies a bearing sleeve for a windscreen wiper drive shaft.
Figure 19:
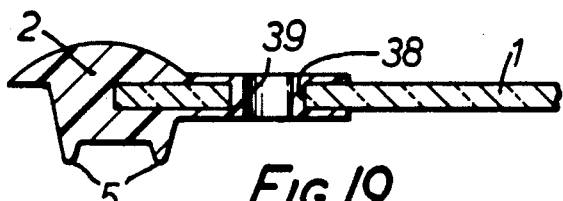
FIG. 19 is a section on line XIX—XIX of FIG. 18 showing the moulded bearing sleeve.

The use of the encapsulation of the lower edge of a windscreen or a rear window to function for assisting the mounting of a wiper is illustrated in FIGS. 18 and 19. FIG. 18 is a part of the lower edge of a windscreen module and there would usually be two holes 38 drilled in the windscreen 1 near to its lower edge before bending and toughening of the windscreen 1. The mould cavity is shaped so that the encapsulation includes sleeves 39 for windscreen wiper drive shafts, which sleeves 39 line the holes 38.

Figure 20:
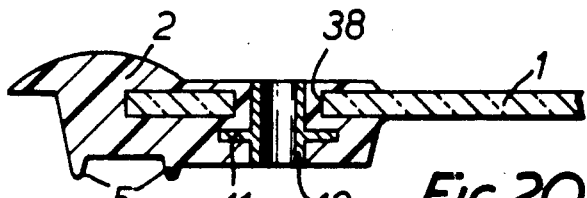
FIG. 20 is a view similar to FIG. 19 showing the incorporation of a bearing sleeve into the encapsulation.

In the embodiment of FIG. 20, a metal cylindrical bearing 40 having a fixing flange 41 is located through each of the holes 38 after the bending and toughening operation. The bearings 40 are held by clips in the holes 38 prior to the placing of the assembled windscreen in the mould. The mould cavity is shaped so that the bearings 40 are embodied in the mould encapsulation and are centrally located in the holes 38 by the moulded plastics material. After moulding the central hole through the bearing 40 provides a secured bearing for a windscreen wiper drive shaft which passes through the bearing 40 with appropriate seals.

Figure 21:
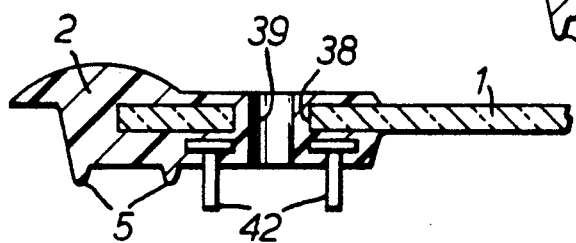
FIG. 21 is a view similar to FIG. 20, showing the incorporation of fixing studs for a wiper motor into the encapsulation.

An alternative bearing for a windscreen wiper drive shaft is illustrated in FIG. 21 in which a bearing sleeve 39 is moulded in each hole 38 from the encapsulating material. Before moulding fixing pins 42 are located in the mould so that they are also embodied in the encapsulation. The pins 42 serve as a mounting for an auxiliary bearing for the drive shaft or even for a miniature wiper motor.

Figure 22:
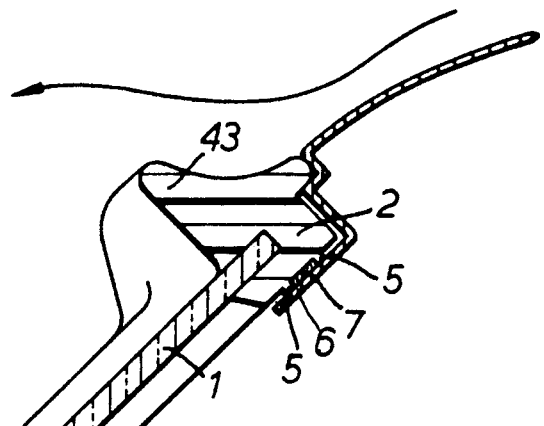
FIG. 22 is a sectional view through a rear window glazing module in which the encapsulation is moulded with an external shape which embodies a moulded spoiler along its upper edge.

An auxiliary function may be performed by the moulded encapsulation by moulding the encapsulation with a special external shape. FIG. 22 illustrates an automobile rear window with an edge-encapsulated glazing module as the rear window and with the encapsulation moulded along the upper edge of the module shaped so as to embody a moulded spoiler 43 which, in known manner, enhances the aerodynamic shape of the rear of the automobile. Alternatively the encapsulation may be moulded with a mounting for such a spoiler.

Other devices may be embodied in the encapsulation, in particular in the interior of the encapsulation of a windscreen, such as a clock, a liquid crystal display or other displays. Electronic modules such as radio pre-amplifiers may be embodied in the encapsulation of any glazing module.

We claim:

1. An edge-encapsulated glazing module for a vehicle, comprising an encapsulation molded-in-place around an edge of a glazing material, the molded-in-place encapsulation being molded with a portion disposed to an exterior side of the module wherein said portion defines means to provide an auxiliary function other than the fitting of the module to a vehicle body.

2. A glazing module according to claim 1, wherein the molded-in-place encapsulation embodies conduit means extending in said portion disposed to the exterior side of the module.

3. A glazing module according to claim 2, wherein the conduit means comprises a hollow tube embedded in the molded-in-place encapsulation and having at least one outlet adjacent a surface of the glazing material.

4. A glazing module according to claim 3, wherein the hollow tube is for water and is connected to at least one outlet nozzle which is embedded in the molded-in-place encapsulation during molding thereof on the glazing material.

5. A glazing module according to claim 1, wherein said portion of the molded-in-place encapsulation is molded with an external shape which performs an auxiliary function.

6. A glazing module according to claim 5, wherein the external shape is aerodynamic.

7. A glazing module according to claim 6, for use as the rear window of a vehicle wherein said portion of the molded-in-place encapsulation is disposed along an upper edge of the module and embodies a molded spoiler.

8. A glazing module according to claim 6, for use as the rear window of a vehicle wherein said portion of the molded-in-place encapsulation is disposed along an upper edge of the module and embodies a mounting for a spoiler.

9. An edge-encapsulated glazing module for a vehicle, comprising an encapsulation molded-in-place around an edge of a glazing material wherein the molded-in-place encapsulation embodies means to provide an auxiliary function other than the fitting of the module to a vehicle body, the molded-in-place encapsulation embodying conduit means.

10. A glazing module according to claim 9, wherein the conduit means comprises electrical leads.

11. A glazing module according to claim 9, which includes a heater and wherein the conduit means comprises electrical leads which are embedded in the molded-in-place encapsulation and which are connected to the heater.

12. A glazing module according to claim 9, which carries a radio aerial, and wherein the conduit means comprises an RF lead which is embedded in the molded-in-place encapsulation and which is connected to the aerial.

13. A glazing module according to claim 9, wherein said conduit means comprises a hollow tube for air which leads to at least one slot which is molded in the molded-in-place encapsulation.

* * * * *